United States Patent
Hoshino et al.

(10) Patent No.: US 8,675,463 B2
(45) Date of Patent: Mar. 18, 2014

(54) OPTICAL DISC DRIVING DEVICE

(75) Inventors: Hiroshi Hoshino, Tokyo (JP); Nobuaki Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1144 days.

(21) Appl. No.: 12/522,122

(22) PCT Filed: Dec. 27, 2007

(86) PCT No.: PCT/JP2007/075101
§ 371 (c)(1),
(2), (4) Date: Jul. 2, 2009

(87) PCT Pub. No.: WO2008/117502
PCT Pub. Date: Oct. 2, 2008

(65) Prior Publication Data
US 2010/0014397 A1   Jan. 21, 2010

(30) Foreign Application Priority Data
Mar. 23, 2007   (JP) .................. 2007-077245

(51) Int. Cl.
*G11B 20/00*   (2006.01)
*G11B 3/74*   (2006.01)

(52) U.S. Cl.
USPC .... 369/94; 369/13.39; 369/44.35; 369/44.29; 369/47.25

(58) Field of Classification Search
USPC ......... 369/53.28, 53.37, 44.26–44.29, 54, 58, 369/53.23, 53.35
See application file for complete search history.

(56) References Cited

U.S. PATENT DOCUMENTS

| | | | |
|---|---|---|---|
| 6,240,054 B1 | 5/2001 | Takeya et al. | |
| 6,298,019 B1 * | 10/2001 | Watanabe et al. | 369/44.27 |
| 6,731,574 B1 * | 5/2004 | Abe et al. | 369/44.32 |
| 2003/0165091 A1 * | 9/2003 | Kadlec | 369/44.28 |
| 2004/0202084 A1 * | 10/2004 | Manoh et al. | 369/94 |
| 2006/0153024 A1 * | 7/2006 | Lee et al. | 369/44.28 |
| 2006/0285452 A1 * | 12/2006 | Nakane | 369/44.29 |
| 2007/0280088 A1 * | 12/2007 | Lin et al. | 369/124.1 |

FOREIGN PATENT DOCUMENTS

| | | |
|---|---|---|
| CN | 1175057 A | 3/1998 |
| JP | 2000-298846 A | 10/2000 |
| JP | 2001-331950 A | 11/2001 |
| JP | 2003-123272 A | 4/2003 |
| JP | 2004-234789 A | 8/2004 |

(Continued)

*Primary Examiner* — Wayne Young
*Assistant Examiner* — Dionne Pendleton
(74) *Attorney, Agent, or Firm* — Birch, Stewart, Kolasch & Birch, LLP

(57) ABSTRACT

An optical disc driving device includes a control circuit 4 for performing a gain adjustment for each of two recording surfaces of a multilayered optical disc 1 on the basis of an FE signal in such a way as to maintain a state in which light is focused onto either of the recording surfaces, to generate a focus servo loop signal, and for generating a focus jump signal for causing either a transition from a state in which the light is focused onto one recording surface to a state in which the light is focused onto the other recording surface, or a transition in the opposite direction from a threshold set up on the basis of an amount of gain adjustment, and a focus actuator driving circuit 5 for performing either a focus jump or an operation of maintaining the state in which the light is focused.

5 Claims, 6 Drawing Sheets

(56) References Cited

FOREIGN PATENT DOCUMENTS

| JP | 2004-303419 A | 10/2004 |
| JP | 2005-85330 A | 3/2005 |
| JP | 2007-4844 A | 1/2007 |
| JP | 2007-26611 A | 2/2007 |

* cited by examiner (a)

(b)

OPTICAL DISC DRIVING DEVICE

FIELD OF THE INVENTION

The present invention relates to an optical disc driving device suitable for use in playback of a multilayered optical disc from which recorded information can be read, the multilayered optical disc having a recording surface in each of at least a first layer and a second layer.

BACKGROUND OF THE INVENTION

A multilayered optical disc enables multiplexing and recording of multiple pieces of information therein in a perpendicular direction. For example, in a two-layer optical disc, a first layer and a second layer are formed with a spacer region being sandwiched by the first and second layers, and a recording surface in the first layer which is closer to a light irradiation surface of the optical disc is formed of a semi-transparent membrane in such a way that light can reach the second layer.

When changing the layer from which recorded information is to be read in playback of the above-mentioned multilayered optical disc, it is necessary to perform an interlayer movement (focus jumping) operation of focusing laser light from an optical pickup unit onto the multilayered optical disc in such a way as to cause the optical pickup unit to make a transition from a state in which the optical pickup unit focuses the laser light therefrom onto the recording surface in the first (or second) layer to a state in which the optical pickup unit focuses the laser light therefrom onto the recording surface in the second (or first) layer. This focus jumping operation is performed on the basis of zero clear detection of a focus error signal (referred to as an FE signal from here on) which is generated on the basis of the output of the optical pickup.

By the way, it is known that variations occur in the amplitude of the FE signal corresponding to each layer due to individual differences in the characteristics of the above-mentioned multilayered optical disc, an objective lens that constructs the optical pickup unit, and so on. Therefore, a problem is that although a threshold is provided for the FE signal corresponding to each layer and an acceleration or deceleration signal is furnished to an actuator used for the focus jump according to the threshold, the acceleration or deceleration signal does not have an appropriate value because of variations in the amplitude of the FE signal and therefore the optical pickup unit cannot perform a focus jump to the desired recording layer in a short time.

An optical disc driving device that, in order to solve this problem, by correcting the amplitude of the FE signal corresponding to each layer in such a way that the amplitude has an identical value, and then applying a threshold to the corrected signal amplitude, can carry out a focus jump correctly even if there are variations in the characteristics of the focus actuator of the optical pickup unit and there is a variation in the distance between the plurality of recording surfaces is known (for example, refer to patent reference 1).
[Patent reference 1] JP,2000-298846,A A problem with the technology disclosed by above-mentioned patent reference 1 is, however, that it is necessary to measure the amplitude of the FE signal corresponding to each layer correctly, and, when, for example, making a focus search by rotating a disc having a surface deflection, it is difficult to carry out the measurement itself because the FE signal corresponding to the same layer appears in synchronization with the rotational cycle, as shown in, for example, FIG. 9(b).

FIGS. 9(a) and 9(b) are views showing a comparison between the FE signal corresponding to each layer of the multilayered optical disc in a case in which the multilayered optical disc has a surface deflection and the FE signal in a case in which the multilayered optical disc has no surface deflection. It is well known that the amplitude of the FE signal is zero when the focal position is far away from the recording layer and exhibits an S-shaped curve as the focal position gets close to the recording layer, and further becomes zero when the focal position reaches the recording layer. In the example shown in FIG. 9(a), because it can be recognized that the S-shaped curve which appears for the first time with respect to the lens position corresponds to the L0 layer (i.e., the first recording layer) and the S-shaped curve which appears for the second time with respect to the lens position corresponds to the L1 layer (i.e., the second recording layer), the amplitude of the FE signal corresponding to each layer can be measured. In contrast, in the example shown in FIG. 9(b), because the S-shaped curve appears several times with respect to the lens position, it cannot be recognized that which S-shaped curve corresponds to which one of the layers, and therefore the amplitude of the FE signal corresponding to each layer cannot be measured.

The present invention is made in order to solve the above-mentioned problems, and it is therefore an object of the present invention to provide an optical disc driving device that implements a stable focus jump even if there are individual differences in the characteristics of a multilayered optical disc, an objective lens which constructs an optical pickup unit of the optical disc driving device, and so on.

DISCLOSURE OF THE INVENTION

In order to solve the above-mentioned problem, there is provided an optical disc driving device including: an optical pickup unit for converting read light which the optical pickup unit has acquired by applying light to a multilayered optical disc from which information can be read from one side thereof and which has a recording surface in each of at least a first layer and a second layer into an electric signal; a control circuit for performing a gain adjustment for each of the first and second layers of the recording surface of the above-mentioned multilayered optical disc on a basis of a focus error signal generated from the above-mentioned electric signal in such a way that a state in which the optical pickup unit focuses the light onto the recording surface in either of the first and second layers is maintained, to generate a focus loop signal for controlling a focus servo loop, and for generating a focus jump signal from a threshold which is set up on a basis of an amount of gain adjustment acquired as a result of the above-mentioned gain adjustment; and a focus actuator driving circuit for driving the above-mentioned optical pickup unit on a basis of either the above-mentioned focus jump signal or the above-mentioned focus loop signal so as to perform either a focus jump or an operation of maintaining the state in which the light is focused.

Furthermore, there is provided an optical disc driving device including: an optical pickup unit for converting read light which the optical pickup unit has acquired by applying light to a multilayered optical disc from which information can be read from one side thereof and which has a recording surface in each of at least a first layer and a second layer into an electric signal; a control circuit for performing a focus balance adjustment on a basis of a focus error signal generated from the above-mentioned electric signal in such a way that a state in which the optical pickup unit focuses the light onto the recording surface in either of the first and second layers of the above-mentioned multilayered optical disc is maintained, so as to generate a focus loop signal for controlling a focus servo loop, and for generating a focus jump signal from a threshold which is set up on a basis of an amount of balance adjustment acquired as a result of the above-mentioned focus balance control; and a focus actuator driving circuit for driving the above-mentioned optical pickup unit on a basis of either the above-mentioned focus jump signal or the above-mentioned focus servo loop signal so as to perform either a focus jump or an operation of maintaining the state in which the light is focused.

Therefore, the optical disc driving device in accordance with the present invention can implement a stable focus jump even if there are individual differences in the characteristics of the multilayered optical disc, an objective lens that constructs the optical pickup unit of the optical disc driving device, and so on.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
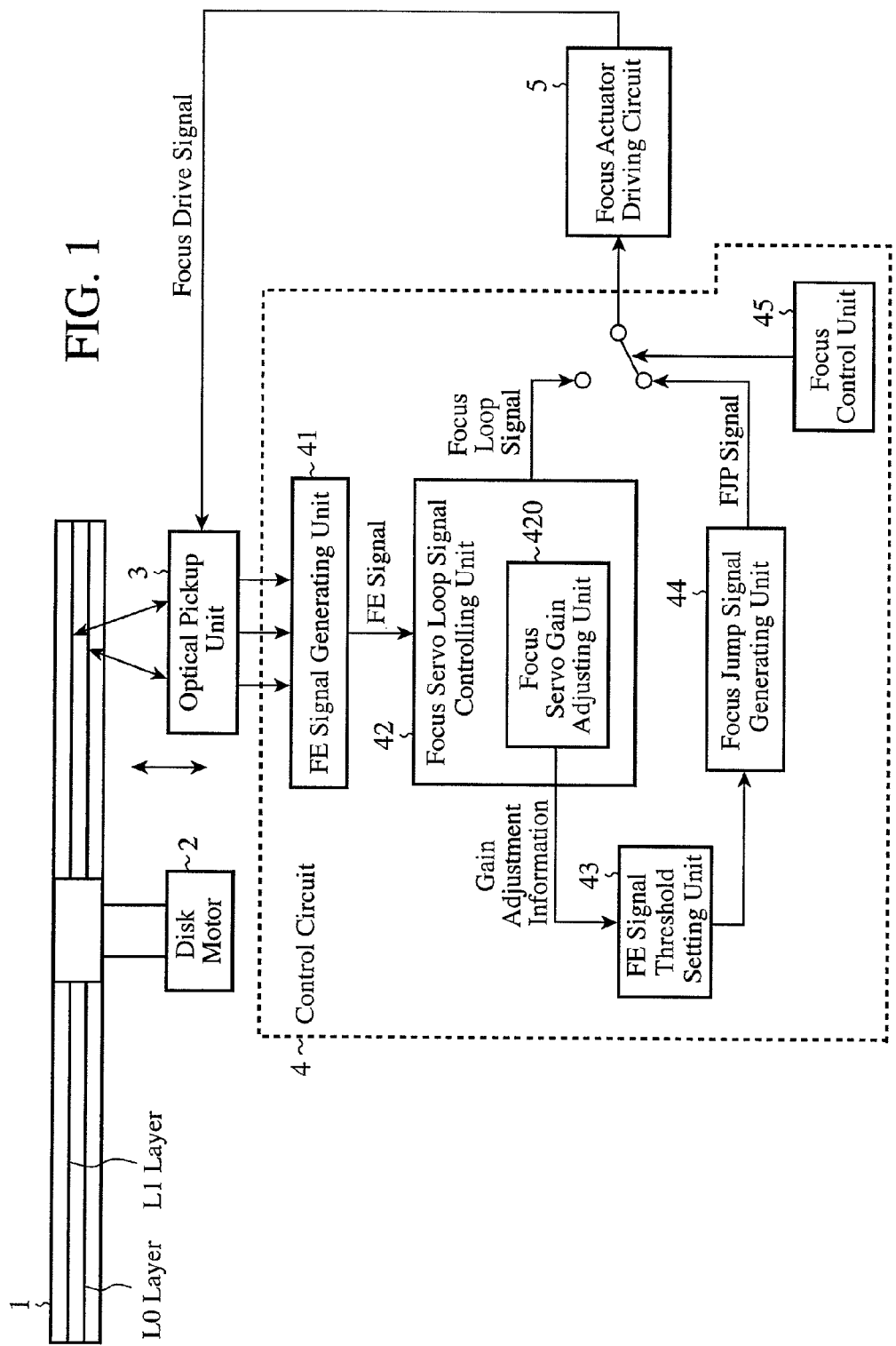
FIG. 1 is a block diagram showing the internal structure of an optical disc driving device in accordance with Embodiment 1 of the present invention.

FIG. 1 is a block diagram showing the internal structure of an optical disc driving device in accordance with Embodiment 1 of the present invention.

As shown in FIG. 1, the optical disc driving device in accordance with Embodiment 1 of the present invention is comprised of a multilayered optical disc 1, a disc motor 2, an optical pickup unit 3, a control circuit 4, and a focus actuator driving circuit 5.

In this embodiment, the multilayered optical disc 1 can be a DVD (Digital Versatile Disc) having a recording surface including two layers L0 and L1 laminated in a direction perpendicular to the surface, and is rotated by the disc motor 2 when mounted to a clamper. The optical pickup unit 3 has a function of converting light which the optical pickup unit has acquired by applying light to the multilayered optical disc 1 from one side of the disc and then reading light reflected from the disc into an electric signal, and then furnishes the electric signal to the control circuit 4, and includes an objective lens, a focus actuator, and so on therein.

The control circuit 4 is comprised of an FE signal generating unit 41, a focus servo loop signal controlling unit 42, an FE signal threshold setting unit 43, a focus jump signal generating unit 44, and a focus control unit 45.

The FE signal generating unit 41 generates an FE signal from the electric signal outputted from the optical pickup unit 3, and furnishes the FE signal to the focus servo loop signal controlling unit 42.

The focus servo loop signal controlling unit 42 performs a gain adjustment for the recording surface in each of the L0 and L1 layers of the multilayered optical disc 1 on the basis of the FE signal generated by the FE signal generating unit 41 in such a way as to maintain a state in which the optical pickup unit focuses the light onto the recording surface in either of the L0 and L1 layers of the multilayered optical disc, so as to control a focus servo loop. In this case, the focus servo means a mechanism (servo) for causing the optical pickup unit 3 to follow upward and downward movements of the multilayered optical disc 1 during rotation by carrying out vertical movement control of the optical pickup unit 3 in order to maintain a constant distance between the objective lens built in the optical pickup unit 3 and the recording surface of the multilayered optical disc 1. In order to perform the focus servo on the optical pickup unit, it is necessary to turn off the focus servo loop first and then control the focus actuator built in the optical pickup unit 3 to keep a distance of, for example, about 20 μm between the objective lens and the recording surface of the multilayered optical disc. At that time, because the amplitude of the FE signal exhibits an S-shaped curve when the objective lens enters a region in which the FE signal can be detected correctly, the control unit detects the zero cross point of the FE signal and turns on the focus servo loop (turns off the vertical movements of the focus actuator). The focus control unit 45 which will be mentioned below performs this control.

The focus servo loop signal controlling unit 42 includes a focus servo gain adjusting unit 420, and this focus servo gain adjusting unit 420 performs a gain adjustment of the focus servo loop in order to maintain the focus state that is stabilized as described above.

On the other hand, the focus error signal threshold setting unit 43 sets up thresholds for the focus error signal on the basis of the amounts of gain adjustment for the data recording surfaces in the L0 and L1 layers of the multilayered optical disc 1, the amounts of gain adjustment being acquired as results of the gain adjustment made by the focus servo loop signal controlling unit 42 including the focus servo loop signal controlling unit 420. The details of the setup of the thresholds will be mentioned below.

Furthermore, the focus jump signal generating unit 44 applies an acceleration or deceleration pulse to the focus servo loop from the thresholds set up by the focus error signal threshold setting unit 43 so as to generate a focus jump signal for causing either a transition from a state in which the optical pickup unit focuses the light onto the data recording surface in the L0 layer of the multilayered optical disc to a state in which the optical pickup unit focuses the light onto the data recording surface in the L1 layer of the multilayered optical disc, or a transition from the state in which the optical pickup unit focuses the light onto the data recording surface in the L1 layer of the multilayered optical disc to the state in which the optical pickup unit focuses the light onto the data recording surface in the L0 layer of the multilayered optical disc. Furthermore, the focus control unit 45 switches between the focus servo loop signal generated by the focus servo loop signal generating unit 42 and the focus jump signal generated by the focus jump signal generating unit 44 so as to control the focus actuator driving circuit 5. In other words, the focus control unit performs ON/OFF control of the focus servo loop.

The focus actuator driving circuit 5 drives the optical pickup unit 3, performs a focal maintaining operation, or performs a focus jumping operation on the basis of either the focus loop signal generated by the focus servo loop signal generating unit 42 or the focus jump signal generated by the focus jump signal generating unit 44.

In the optical disc driving device having the above-mentioned structure, the control circuit 4 generates the FE signal from the electric signal outputted by the optical pickup unit 3 by using the FE signal generating unit 41 first, and outputs the FE signal to the focus servo loop signal generating unit 42. Thereby, the focus servo loop signal controlling unit 42 generates the focus loop signal from the FE signal.

By the way, when maintaining the focus established for the data recording surface of either of the L0 and L1 layers of the multilayered optical disc 1, the focus control unit 45 outputs the focus loop signal to the focus actuator driving circuit 5, and, as a result, the focus actuator driving circuit 5 can generate the focus drive signal to control the vertical movements of the optical pickup unit 3. At that time, the focus drive signal drives the focus actuator included in the optical pickup unit 3 so as to maintain the state in which the optical pickup unit focuses the light onto the data recording surface of either of the L0 and L1 layers of the multilayered optical disc 1 is achieved. This loop of the signals is called the focus servo loop. Although it is necessary to adjust the gain of the above-mentioned focus servo loop properly in order to maintain the focus with stability, the focus servo gain adjusting unit 420 included in the focus servo loop signal controlling unit 42 performs the adjustment.

On the other hand, when performing a focus jump, the control circuit 4 controls the switch SW by using the focus control unit 45 to output the focus jump signal generated by the focus jump signal generating unit 44 to the focus actuator driving circuit 5. As a result, the focus actuator driving circuit 5 can generate the focus drive signal so as to control the vertical movements of the optical pickup unit 3. At that time, the focus drive signal drives the focus actuator included in the optical pickup unit 3 so as to perform a focus jump.

More specifically, according to the threshold levels set up by the FE signal threshold setting unit 43, the focus jump signal generating unit 44 generates the focus jump signal while monitoring the FE signal. Conventionally, these threshold levels are determined uniquely on all conditions. In contrast, in accordance with this embodiment, the threshold levels are set up on the basis of the gain adjustment information outputted by the focus servo gain adjusting unit 420. The details of the setup of the threshold levels will be explained hereafter.

Figure 2:
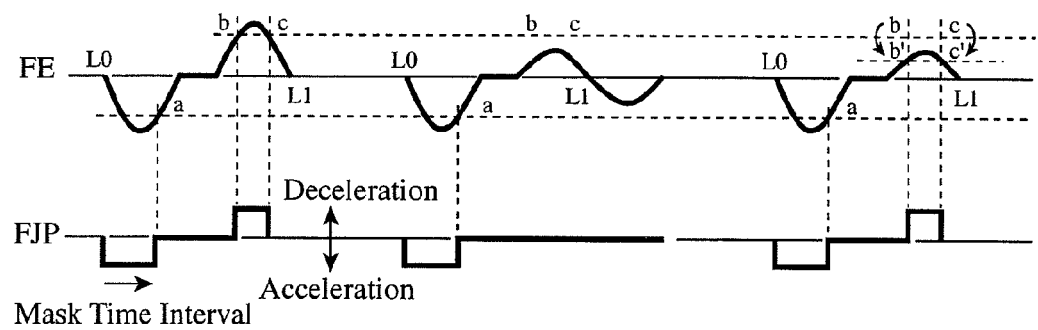
FIG. 2 is a view showing an example of the waveform of an FE signal generated in the optical disc driving device in accordance with Embodiment 1 of the present invention.

FIG. 2 is a timing chart shown in order to explain the operation of the optical disc driving device in accordance with Embodiment 1 of the present invention, and shows a relation between the FE signal which is generated by the FE signal generating unit 41 when the optical disc driving device moves the optical pickup unit 3 (the objective lens) in such a way that its focal point moves from the data recording surface in the L0 layer of the multilayered optical disc 1 to the data recording surface in the L1 layer, and the focus jump signal (FJP) which is generated by the focus jump signal generating unit 44 at the time when the optical disc driving device moves the optical pickup unit.

Figure 3:
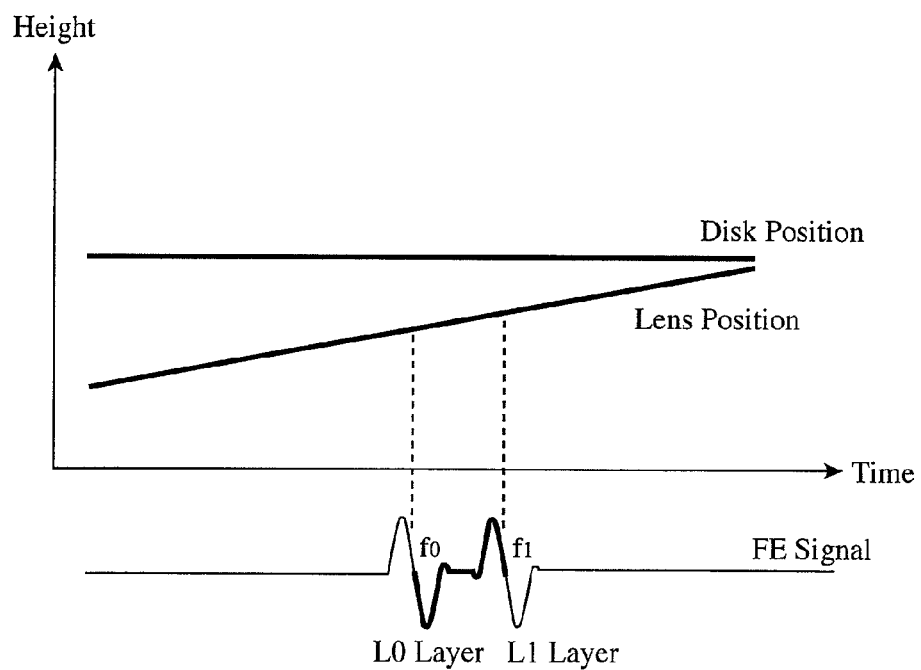
FIG. 3 is a view showing a relation between a working distance and the FE signal, the relation being required in order for the optical disc driving device in accordance with Embodiment 1 of the present invention to maintain a focus state.

Furthermore, FIG. 3 is a view shown in order to explain a relation between a working distance (the distance between the lens of the optical pickup unit 3 and the multilayered optical disc 1 at the time when the focus is achieved) and the FE signal, the working distance being a target to be controlled by the optical disc driving device in accordance with Embodiment 1 of the present invention in order to maintain the focus state. This figure shows an example of the FE signal which is generated when the optical pickup unit 3 (the objective lens) is gradually moved from a position relatively distant from the multilayered optical disc 1 to a position close to the multilayered optical disc (to a focused point in the L0 or L1 layer), and in FIG. 3 a waveform portion shown by a thick line corresponds to the waveform shown in FIG. 2. In this case, $f_0$ corresponds to the focused point on the data recording surface in the L0 layer of the multilayered optical disc 1, and $f_1$ corresponds to the focused point on the data recording surface in the L1 layer of the multilayered optical disc.

FIG. 2(a) is a timing chart showing a situation in which the optical disc driving device generates the focus jump signal in a case of carrying out a focus jump from the data recording surface in the L0 layer of multilayered optical disc 1 to the data recording surface in the L1 layer, and illustrates a case in which the threshold levels of the FE signal are set to be the same for each layer of the multilayered optical disc 1. In this case, three levels a, b, and c are set up as the thresholds for the FE signal.

In FIG. 2(a), the focus jump signal which is furnished from the control circuit 4 (the focus jump signal generating unit 44) to the focus actuator driving circuit is an acceleration pulse first, and the focus jump control by the focus actuator driving circuit 5 is then started. When the FE signal reaches the threshold level a, the acceleration using the acceleration pulse is completed. In general, a mask time interval required to provide an appropriate acceleration force in consideration of inertia is incorporated into the acceleration time period during which the acceleration is performed. During this mask time interval, the focus actuator driving circuit does not stop the acceleration even if the FE signal reaches the threshold level a. Next, when the FE signal reaches the threshold level b, the focus actuator driving circuit starts slowing down the optical pickup unit according to a deceleration pulse. Furthermore, when the FE signal reaches the threshold level c, the optical disc driving device ends the slowdown according to the deceleration pulse, and then ends the focus jumping operation. The optical disc driving device then controls the focus control unit 45 to make a transition to the focus maintaining operation according to the servo loop signal.

A situation in which the optical disc driving device generates the focus jump signal when the amplitude of the FE signal differs according to whether the FE signal corresponds to the data recording surface in the L0 or L1 layer because of the characteristics of the multilayered optical disc 1 and the optical pickup unit 3, and the amplitude of the FE signal corresponding to the L0 layer is larger than that corresponding to the L1 layer is shown in FIG. 2(*b*). In this case, because the amplitude of the FE signal corresponding to the data recording surface in the L1 layer is small and the FE signal does not reach the threshold level b, no deceleration pulse is generated and therefore the focus jump cannot be carried out.

Figure 9:
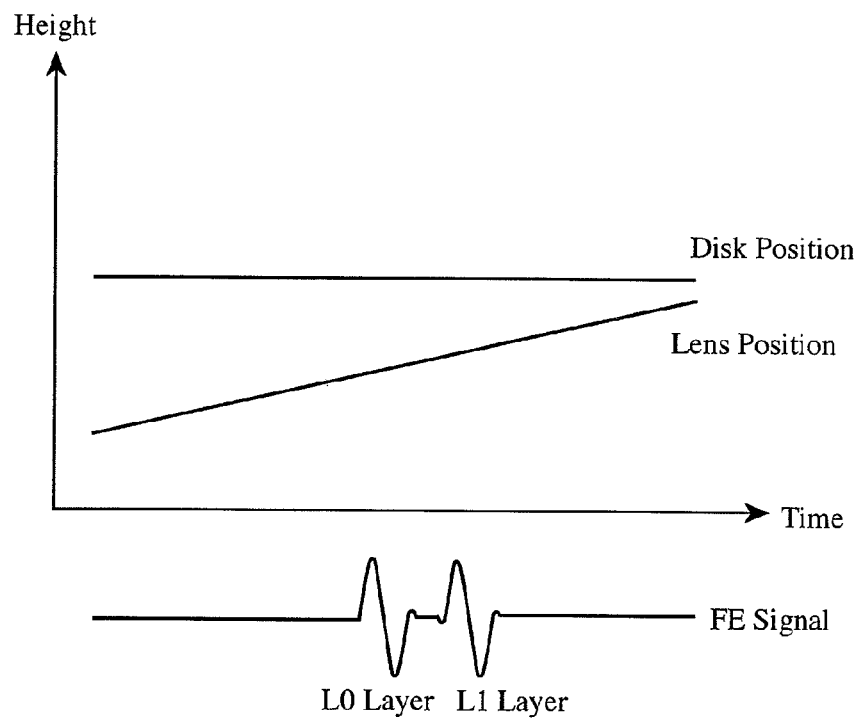
FIG. 9 is a view shown in order to explain a relation between a working distance and an FE signal in a case in which a disc has a surface deflection and in a case in which the disc has no surface deflection.
Figure 9:
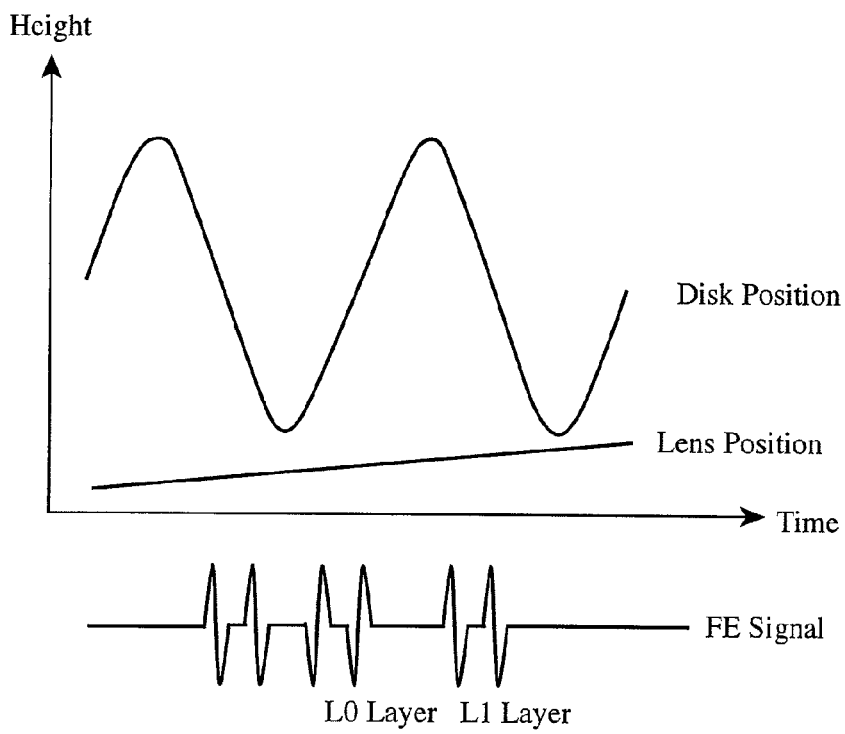

To solve this problem, in the optical disc driving device in accordance with Embodiment 1 of the present invention, the control circuit 4 (the FE signal threshold setting unit 43) changes the threshold levels b and c to threshold levels b' and c' according to the FE signal amplitude level corresponding to the data recording surface in the L1 layer, and applies an appropriate deceleration pulse to the optical pickup unit, as shown in FIG. 2(*c*). To this end, the optical disc driving device needs to acquire the amplitude level of the FE signal corresponding to the data recording surface in each layer. An actual measurement of the amplitude level of the FE signal causes difficulties of having to measure the amplitude level of the FE signal while, for example, rotating a disc having a surface deflection, as shown in FIG. 9 as a background of the present invention. Therefore, the optical disc driving device of this embodiment changes the threshold levels on the basis of the amount of gain adjustment for each layer. The details of the changing operation will be explained hereafter.

Figure 4:
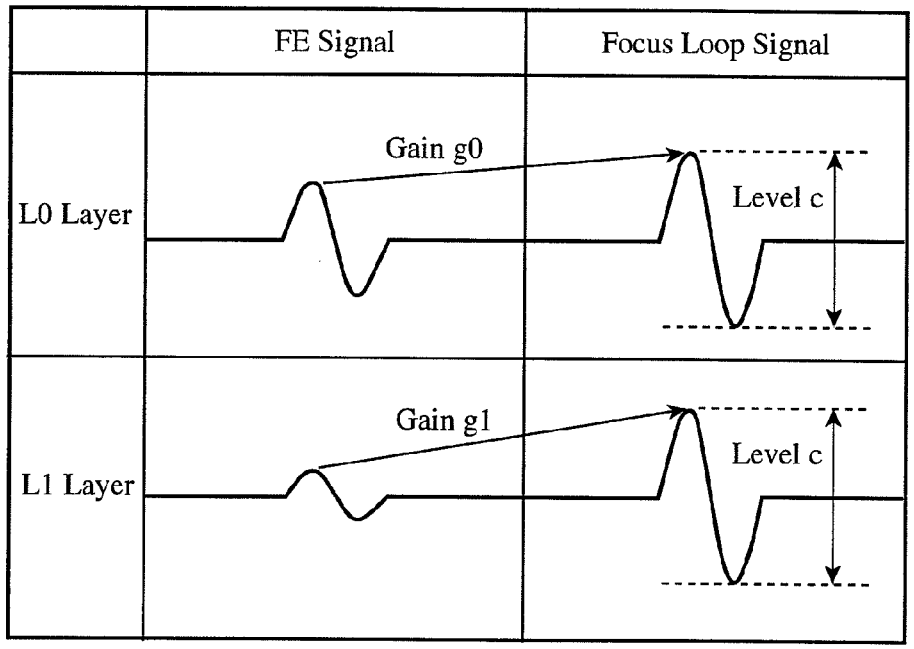
FIG. 4 is an operation conceptual diagram shown in order to explain the operation of the optical disc driving device in accordance with Embodiment 1 of the present invention.

FIG. 4 is an operation conceptual diagram showing the operation of the focus servo gain adjusting unit 420 with waveforms in a case in which the amplitude level of the FE signal corresponding to the L0 layer is larger than that corresponding to the L1 layer. In this figure, both a relation between the amplitude of the FE signal which is generated from read light acquired from the recording surface in the L0 layer of the multilayered optical disc 1 and the focus servo loop signal generated through the gain adjustment and a relation between the amplitude of the FE signal which is generated from read light acquired from the recording surface in the L1 layer of the multilayered optical disc 1 and the focus servo loop signal generated through the gain adjustment are shown in comparison with each other.

In order to maintain the stable focus (the distance between the data recording surface in either of the L0 and L1 layers of the multilayered optical disc 1 and the objective lens of the optical pickup unit 3), in a case in which both the focus actuator driving circuit 5 and the optical pickup unit 3 (the focus actuator) have the same sensitivity (mm/V), the focus servo loop signal needs to be adjusted in such a way as to have the same signal level even if the generated FE signal has an amplitude which differs according to whether it corresponds to the L0 or L1 layer of the multilayered optical disc. Therefore, the focus servo gain adjusting unit 420 performs an optimal gain adjustment for each layer (generates the focus loop signal having the same level c by multiplying the FE signal corresponding to the L0 layer by a gain $g_0$ and by multiplying the FE signal corresponding to the L1 layer by a gain $g_1$), as shown in FIG. 4, and changes the threshold levels for comparison with the amplitude of the FE signal on the basis of the gain adjustment information (the gains $g_0$ and $g_1$). The amplitude of the FE signal and the gain adjustment information (the gains $g_0$ and $g_1$) are in inverse proportion.

Figure 5:
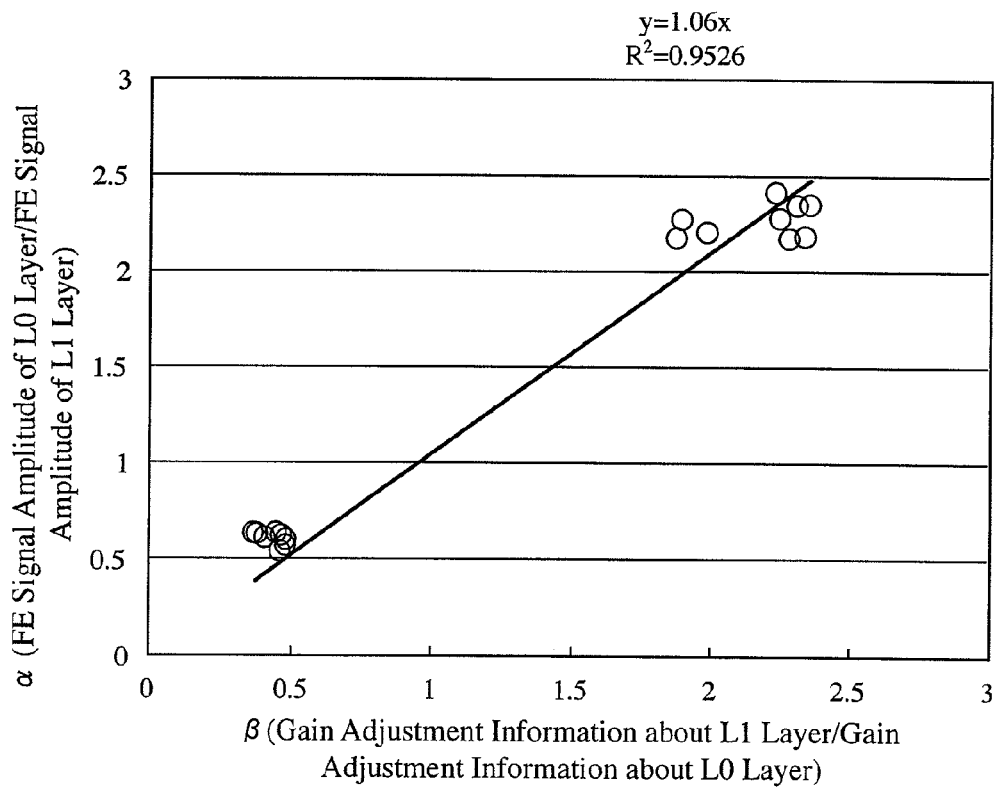
FIG. 5 is a view showing actual measurement data shown in order to explain the operation of the optical disc driving device in accordance with Embodiment 1 of the present invention.

FIG. 5 is a graph showing the results of measurements of the amplitude of the FE signal and the amounts of gain adjustment, and shows that there is a strong correlation between the amounts of gain adjustment and the amplitude of the FE signal. In this figure, the vertical axis shows $\alpha$=(the amplitude of the FE signal corresponding to the L0 layer)/((the amplitude of the FE signal corresponding to the L1 layer), and the horizontal axis shows $\beta$=(the gain adjustment information on the L1 layer)/(the gain adjustment information on the L0 layer).

As can be seen from FIG. 5, in a case in which, for example, the multilayered disc 1 is formed in such a way that the amplitude level of the FE signal corresponding to the L0 layer is twice as high as that corresponding to the L1 layer, both $\alpha$ and $\beta$ have values close to 0.5, whereas in a case in which the multilayered disc 1 is formed in such a way that the amplitude level of the FE signal corresponding to the L0 layer is one-half as high as that corresponding to the L1 layer, both $\alpha$ and $\beta$ have values close to 2. It is verified form these results that there is a strong correlation (y=1.06x) between $\alpha$ and $\beta$. Using this graph, the optical disc driving device can calculate the amplitude of the signal corresponding to each layer from the gain adjustment information about each layer of the multilayered optical disc 1, and can therefore change the FE signal threshold levels to optimal values at the time when performing a focus jump.

In the above-mentioned optical disc driving device in accordance with Embodiment 1 of the present invention, the FE signal threshold setting unit 43 changes the threshold levels for comparison with the amplitude of the FE signal on the basis of the gain adjustment information (the gains $g_0$ and $g_1$) which is outputted by the focus servo loop signal controlling unit 42 (the focus servo gain adjusting unit 420). Therefore, even in a case in which there are individual differences in the characteristics of the multilayered optical disc 1, the optical pickup unit 3 (the focus actuator), and the focus actuator driving circuit 5, the optical disc driving device can perform a stable focus jump.

In a case in which a normalizing means of normalizing the FE signal using temperature compensation or the like is included in the focus servo loop, the optical disc driving device can also consider this normalizing means as a part of the gain adjustment to reflect the normalized information acquired in the above-mentioned gain adjustment information.

Embodiment 2

Figure 6:
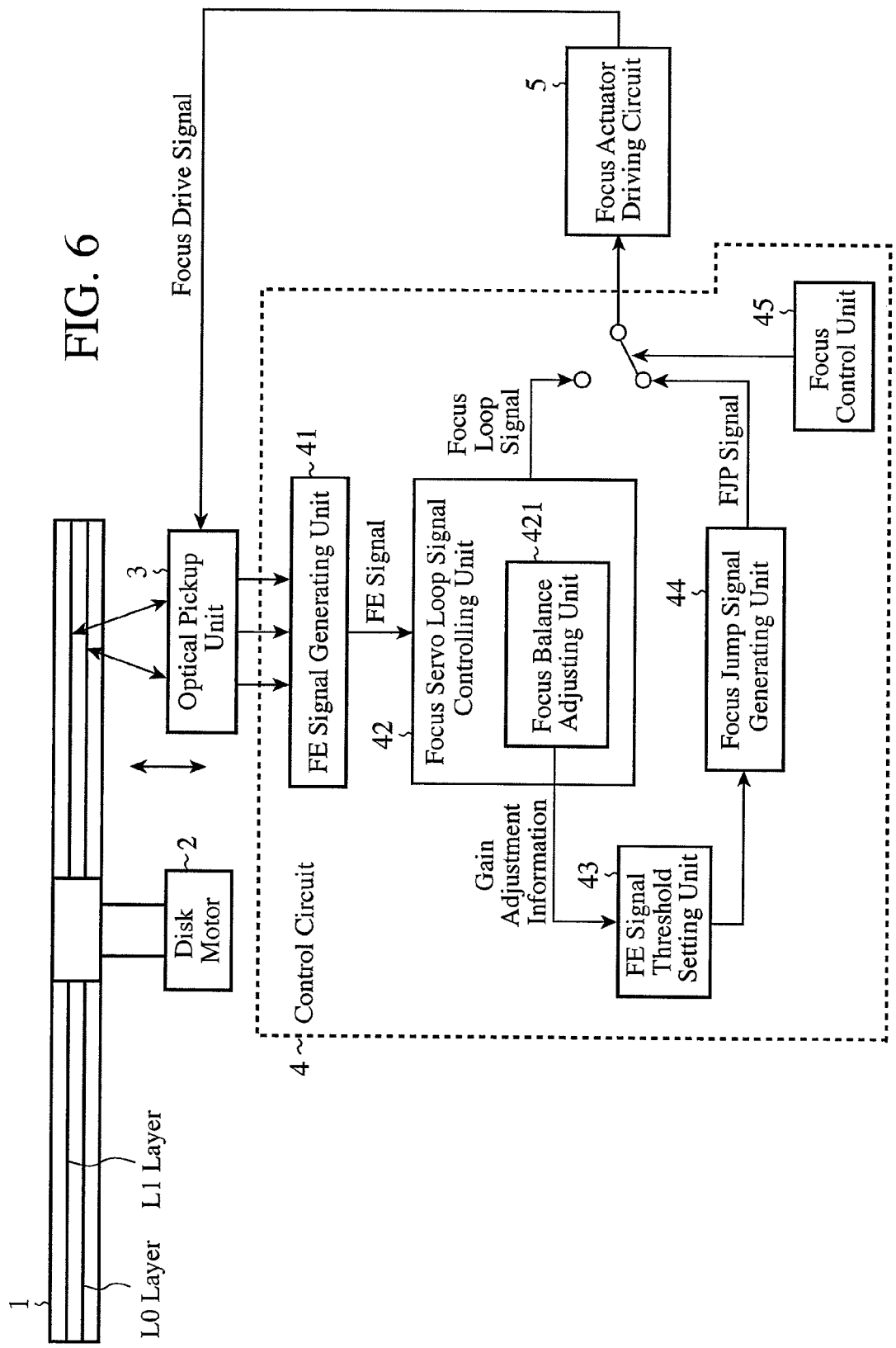
FIG. 6 is a block diagram showing the internal structure of an optical disc driving device in accordance with Embodiment 2 of the present invention.

FIG. 6 is a block diagram showing the internal structure of an optical disc driving device in accordance with Embodiment 2 of the present invention. The optical disc driving device in accordance with this Embodiment 2 differs from that in accordance with Embodiment 1 shown in FIG. 1 in that, instead of outputting the gain adjustment information (the gains $g_0$ and $g_1$) generated by the focus servo gain adjusting unit 420 to the FE signal threshold setting unit 43 to set up the threshold levels by using the focus servo loop signal controlling unit 42 of the control circuit 4, the optical disc driving device in accordance with Embodiment 2 includes a focus balance adjusting unit 421, and this focus balance adjusting unit 421 generates and outputs symmetry (balance) adjustment information ($b_0$ and $b_1$) to set up the threshold levels. The other structure of the optical disc driving device in accordance with Embodiment 2 is the same as that in accordance with above-mentioned Embodiment 1.

Figure 7:
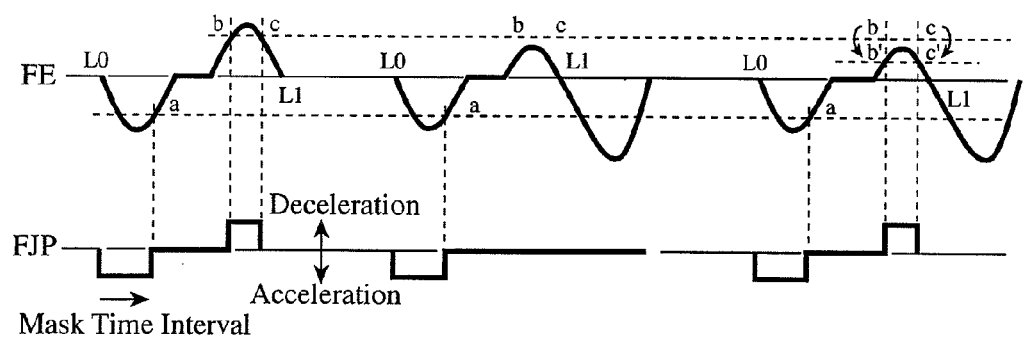
FIG. 7 is a timing chart shown in order to explain the operation of the optical disc driving device in accordance with Embodiment 2 of the present invention.

FIG. 7 is a timing chart shown in order to explain the operation of the optical disc driving device in accordance with Embodiment 2 of the present invention, and shows a relation between an FE signal which is generated by an FE signal generating unit 41 when the optical disc driving device moves an optical pickup unit 3 in such a way that its focal point moves from a data recording surface in an L0 layer of a multilayered optical disc 1 to a data recording surface in an L1 layer of the multilayered optical disc and a focus jump signal (FJP) which is generated by a focus jump signal generating unit 44 at the time when the optical disc driving device moves the optical pickup unit.

Figure 8:
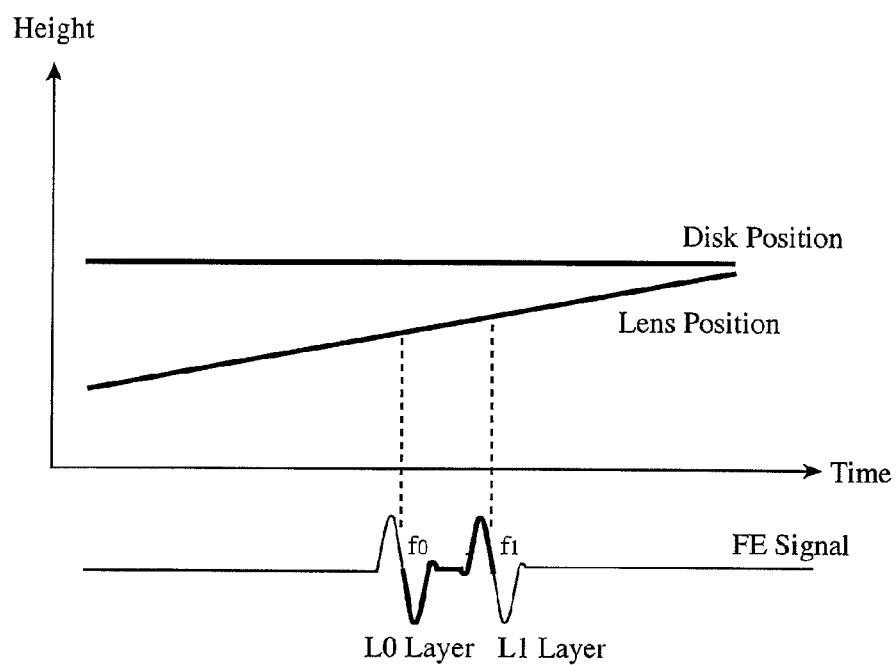
FIG. 8 is a view showing a relation between a working distance and an FE signal, the relation being required in order for the optical disc driving device in accordance with Embodiment 2 of the present invention to maintain a focus state.

FIG. 8 is a view showing a relation between a working distance and the FE signal, the working distance being a target to be controlled by the optical disc driving device in accordance with Embodiment 2 of the present invention in order to maintain the focus state. This figure shows an example of the FE signal which is generated when the optical pickup unit 3 is gradually moved from a position relatively distant from the data recording surface in each of the L0 and L1 layers of the multilayered optical disc 1 to a position close to the multilayered optical disc (to a focused point in the L0 layer and a focused point in the L1 layer), and in FIG. 3 a waveform portion shown by a thick line corresponds to the waveform shown in FIG. 2. In this case, $f_0$ corresponds to the focused point on the data recording surface in the L0 layer of the multilayered optical disc 1, and $f_1$ corresponds to the focused point on the data recording surface in the L1 layer of the multilayered optical disc.

FIG. 7(a) is a timing chart showing a situation in which the optical disc driving device generates the focus jump signal in a case of carrying out a focus jump from the data recording surface in the L0 layer of the multilayered optical disc 1 to the data recording surface in the L1 layer in a case in which the FE signal exhibits the same symmetrical characteristics for the data recording surface in each of the L0 and L1 layers of the multilayered optical disc 1. In this case, three levels (a, b, and c) are set up as the thresholds for the FE signal.

In FIG. 7(a), the focus jump signal generated by the focus jump signal generating unit 44 is furnished, as an acceleration pulse, from the control circuit to a focus actuator driving circuit 5 first, and a focus jump operation by the focus actuator driving circuit 5 is then started. At the timing at which the FE signal then reaches the threshold level a, the acceleration for the upward or downward movements of the optical pickup unit 3 using the acceleration pulse is ended. In general, a mask time interval required to provide an appropriate acceleration force is incorporated into the acceleration time period during which the acceleration is performed. During this mask time interval, the focus actuator driving circuit does not end the acceleration even if the FE signal reaches the threshold level a. Next, when the FE signal reaches the threshold level b, the focus actuator driving circuit 5 starts slowing down the optical pickup unit according to a deceleration pulse. Furthermore, when the FE signal reaches the threshold level c, the optical disc driving device ends the slowdown according to the deceleration pulse, and then ends the focus jumping operation on the optical pickup unit 3. The optical disc driving device then makes a transition to a focus maintaining operation according to a servo loop signal generated by a focus servo loop signal generating unit 42 under switching control by a focus control unit 45.

A situation in which the FE symmetry of the data recording surface in the L1 layer is shifted in a downward direction due to the characteristics of the multilayered optical disc 1 and the optical pickup unit 3 (however, the FE signal has the same peak-to-peak value) is shown in FIG. 7(b).

In this case, because the FE signal does not reach the threshold level b, no deceleration pulse is applied and therefore the focus jump cannot be carried out. To solve this problem, in the optical disc driving device in accordance with Embodiment 2 of the present invention, the control circuit 4 (the FE signal threshold setting unit 43) changes the threshold levels b and c to threshold levels b' and c' according to the FE signal symmetry corresponding to the data recording surface in the L1 layer, and applies an appropriate deceleration pulse to the optical pickup unit, as shown in FIG. 7(c).

In the above-mentioned optical disc driving device in accordance with Embodiment 2 of the present invention, the FE signal threshold setting unit 43 changes the threshold levels for comparison with the amplitude of the FE signal on the basis of the symmetry adjustment information ($b_0$ and $b_1$) which is outputted by the focus servo loop signal controlling unit 42 (the focus balance adjusting unit 421). Therefore, even in a case in which there are characteristics individual differences in the multilayered optical disc 1, the optical pickup unit 3 (the focus actuator), and the focus actuator driving circuit 5, the optical disc driving device can perform a stable focus jump.

In a case in which a normalizing means of normalizing the FE signal using temperature compensation or the like is included in the focus servo loop, the optical disc driving device can also consider this normalizing means as a part of the gain adjustment to reflect the normalized information acquired in the above-mentioned symmetry adjustment information.

In Embodiment 2 shown in FIG. 6, the focus servo loop signal controlling unit 42 is constructed in such a way as to include only the focus balance adjusting unit 421. As an alternative, the focus servo loop signal controlling unit can also include the same focus servo gain adjusting unit 420 as that of Embodiment 1 shown in FIG. 1, and can reflect the amount of gain adjustment generated by the focus servo gain adjusting unit 420 in the above-mentioned control operation of changing the threshold levels by the focus balance adjusting unit 421. Furthermore, in Embodiment 1 shown in FIG. 1, the focus servo loop signal controlling unit 42 is constructed in such a way as to include only the focus servo gain adjusting unit 420. As an alternative, the focus servo loop signal controlling unit can also include the same focus balance adjusting unit 421 as that in accordance with Embodiment 2 shown in FIG. 6, and can reflect the amount of FE symmetry adjustment generated by the focus balance adjusting unit 421 in the above-mentioned control operation of changing the threshold levels by the focus servo gain adjusting unit 420. In this case, the optical disc driving device can perform a more-stable focus jump.

Furthermore, in accordance with above-mentioned Embodiments 1 and 2, the optical disc driving device performs the control operation of changing the threshold levels on the basis of the gain adjustment results or the symmetry adjustment results. The optical disc driving device can alternatively use either a total reflection signal (AS) from the recording surface in each layer that constructs the multilayered optical disc 1, or FE offset measurement results, instead of the above-mentioned normalized signal. In this variant, the same advantage is provided. In addition, in accordance with above-mentioned Embodiments 1 and 2, as the multilayered optical disc 1, only the optical disc 1 of two-layer type having the data recording surface in each of the L0 layer and the L1 layer is illustrated. The present can also be applied to a multilayered optical disc having a data recording surface in each of three or more data recording layers.

The control circuit 4 of the optical disc driving device shown in FIG. 1 or 6 is concretely constructed of a DSP (Digital Signal Processor) and a microcomputer (CPU). Each of the FE signal generating unit 41, the focus servo loop signal controlling unit 42, the FE signal threshold setting unit 43, the focus jump signal generating unit 44, the focus control unit 45, the focus servo gain adjusting unit 420, and the focus balance adjusting unit 421, which constructs the control circuit 4, belongs to either the above-mentioned DSP or the above-mentioned microcomputer. The focus actuator driving circuit 5 can be constructed of an LSI disposed independently from the above-mentioned DSP and the above-mentioned microcomputer, and the FE signal generating unit 41, which is included, as previously explained, in the control circuit 4, can be alternatively constructed of an LSI which is disposed independently from the above-mentioned DSP and the above-mentioned microcomputer like the focus actuator driving circuit 5.

INDUSTRIAL APPLICABILITY

As mentioned above, the optical disc driving device in accordance with the present invention can implement a focus jump independent of individual differences in characteristics by setting up thresholds for comparison with the amplitude of the FE signal on the basis of gain adjustment information. Therefore, the optical disc driving device in accordance with the present invention is suitable for use in playback or the like of a multilayered optical disc from one side of which recorded information can be read, the optical disc having a recording surface in each of at least a first layer and a second layer.

The invention claimed is:

1. An optical disc driving device comprising:
   an optical pickup unit for converting read light into an electric signal, the read light being acquired by the optical pickup unit by applying light to a multilayered optical disc from which information can be read from one side thereof and which has a recording surface in each of at least a first layer and a second layer;
   a control circuit for
      performing a gain adjustment for each of the first and second layers of the recording surface based on a focus error signal generated from said electric signal, said performing a gain adjustment being accomplished so as to maintain a state in which the optical pickup unit focuses the applied light onto the recording surface in either of the first and second layers,
      generating a focus loop signal for controlling a focus servo loop, and
      generating a focus jump signal from a threshold, said threshold being based on an amount of gain adjustment acquired as a result of said performing a gain adjustment; and
   a focus actuator driving circuit for driving said optical pickup unit based on either the focus jump signal or the focus loop signal so as to either perform a focus jump or maintain the state in which the applied light is focused.

2. The optical disc driving device according to claim 1, wherein said control circuit includes:
   a focus servo loop signal controlling unit for performing the gain adjustment for each of the first and second layers based on said focus error signal in such a way that the state in which the applied light is focused is maintained so as to output pieces of gain adjustment information for controlling said focus servo loop;
   a focus error signal threshold setting unit for setting up thresholds for said focus error signal based on the outputted pieces of gain adjustment information;
   a focus jump signal generating unit for applying an acceleration or deceleration pulse to said focus servo loop from the set up thresholds to generate a focus jump signal for causing the optical pickup unit to either
      transition from focusing the applied light onto the data recording surface in the first layer to focusing the applied light onto the data recording surface in the second layer, or
      transition from focusing the applied light onto the data recording surface in the second layer to focusing the applied light onto the data recording surface in the first layer; and
   a focus control unit for switching between the outputted pieces of gain adjustment information and the focus jump signal so as to control said focus actuator driving circuit.

3. The optical disc driving device according to claim 2, wherein said focus error signal threshold setting unit sets up the thresholds based on normalized information of the focus error signal corresponding to the data recording surface in each of the first and second layers.

4. The optical disc driving device according to claim 1, wherein
   the control circuit generates the focus jump signal in such a way that the control circuit stops generating an acceleration pulse when the focus error signal reaches a threshold (a) after a mask time lapses, and starts generating a deceleration pulse when the focus error signal reaches a threshold (b, b').

5. The optical disc driving device according to claim 1, wherein
   the control circuit generates the focus loop signal, when the focus error signal becomes less than the threshold (c, c').

* * * * *